United States Patent [19]

Dell

[11] 4,140,217

[45] Feb. 20, 1979

[54] DUST SEAL

[76] Inventor: Nicholas R. Dell, 7544 Clarendon Hills Rd., Willowbrook, Ill. 60514

[21] Appl. No.: 820,225

[22] Filed: Jul. 29, 1977

[51] Int. Cl.² ............................................. B65G 47/74
[52] U.S. Cl. ..................................... 198/836; 198/636
[58] Field of Search ............... 198/836, 497, 499, 525, 198/534, 540, 547, 550, 557, 562, 599, 633, 635, 636, 637

[56] References Cited

U.S. PATENT DOCUMENTS

| Re. 26,347 | 2/1968 | Oury | 198/525 |
|---|---|---|---|
| 2,665,795 | 1/1954 | Holwick | 198/836 |
| 2,709,514 | 5/1955 | Miller | 198/315 |
| 2,758,700 | 8/1956 | Plumb | 198/836 |
| 3,499,523 | 3/1970 | Clegg | 198/836 |
| 3,759,227 | 9/1973 | Wolfe et al. | 198/540 |

FOREIGN PATENT DOCUMENTS 2203756  5/1974  France ..................................... 198/499

*Primary Examiner*—John J. Love
*Assistant Examiner*—Richard K. Thomson
*Attorney, Agent, or Firm*—Mason, Kolehmainen, Rathburn & Wyss

[57] ABSTRACT

A dust seal for a material conveyor belt and material chute includes an elongated body of a polygonal configuration. The body includes an axial bore defined within the body and extending the length thereof. An attachment device is included for securing the dust seal at a point upstream of the chute and on the belt to allow gravity and friction developed between the moving belt and the dust seal to move the dust seal to a position adjacent the chute so as to provide a seal to prevent the escape of material from around the chute.

7 Claims, 4 Drawing Figures

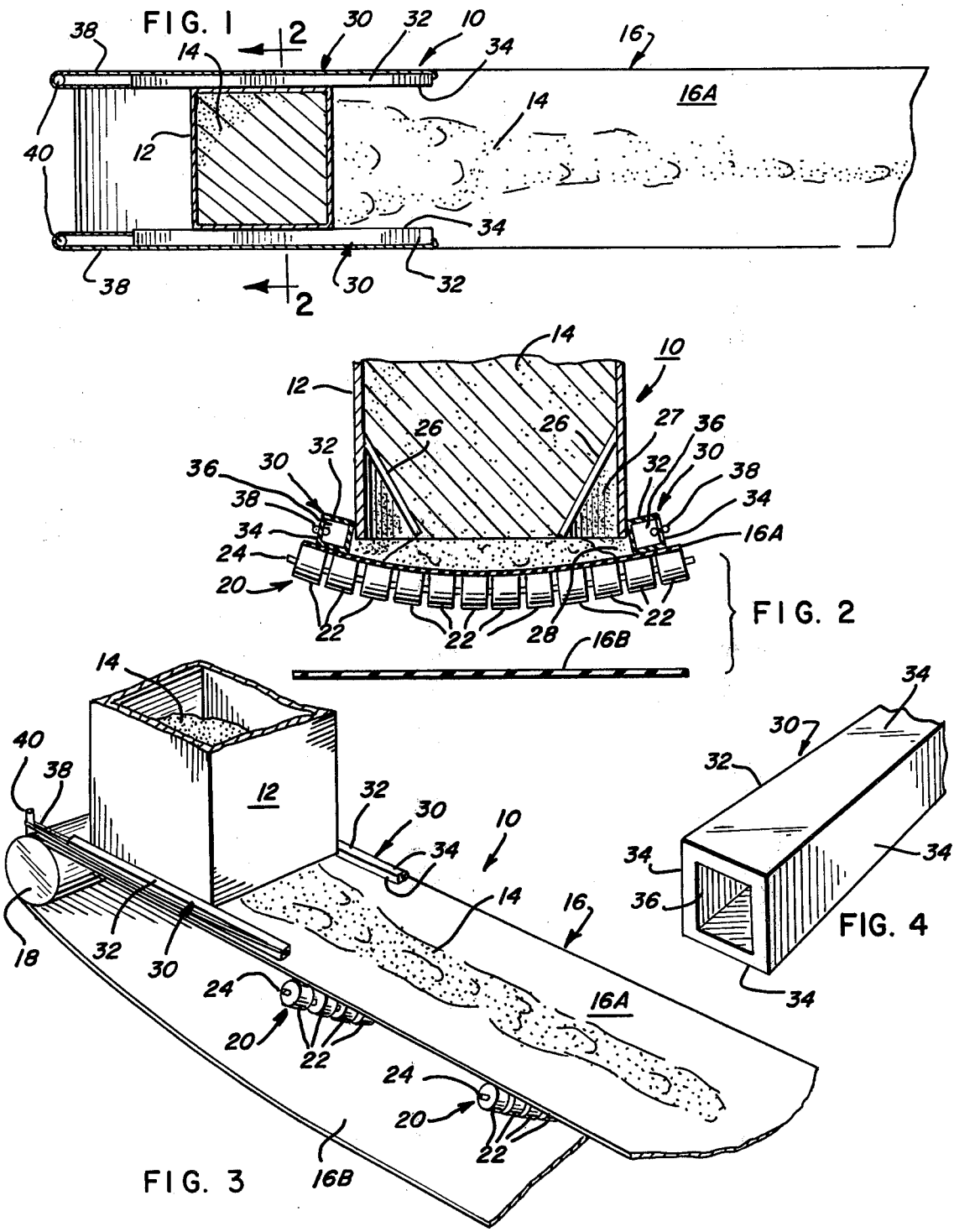

DUST SEAL

BACKGROUND OF THE INVENTION

A. Field of the Invention

The device of the present invention relates to a new and improved seal for preventing the escape of particles of material during loading of material onto a conveyor belt.

B. Description of the Prior Art

Transportation of material such as sand, grain or similar material is economically accomplished over short distances by conveyor belt systems. Typically, such a system includes a hopper containing the material and a chute for depositing the material from the hopper onto a conveyor belt. The material is then transferred by the conveyor belt to another location.

To prevent wear of the belt, it is spaced a short distance, or by a gap, from the bottom of the chute. Accordingly, upon depositing material from the chute onto the conveyor belt, dust or particles of the material such as fines may escape through the gap due to the turbulence created below the chute. These escaping particles can create an undesirable atmospheric condition, and interfere with moving parts of the conveyor system, causing jamming or shutdown of the equipment and requiring extensive cleaning.

To prevent or reduce the amount of escaping particles of material, prior art systems employ skirt boards that are secured to the chute by bolts or similar fasteners and extend from the chute to within a short distance of the conveyor belt. The skirt boards block or cover the gap between the bottom of the chute and the upper surface of the belt thereby reducing the escape of materials. In addition, the skirt board may extend downstream a short distance from the chute to assist in orientation of the material onto the center of the conveyor belt.

A gap between the bottom of the prior art skirt boards and the conveyor belt, however, is desirable since the prior art skirt boards are fabricated from discarded conveyor belts or similar rubber material, and may be of a durometer hardness substantially the same as the conveyor belt. Accordingly, the skirt board should not contact the conveyor belt during operation since to do so would result in rapid wear of both the belt and the skirt board. The small gap between the bottom edge of the skirt board and the upper surface of the belt, while reducing belt wear, allows particles of material to escape. Consequently, although the problem created by the dust or particles of material is reduced, a significant amount of material can still escape.

In addition, even with the small gap provided, material may become lodged between the bottom of the skirt boards and the upper surface of the belt resulting in wear of the skirt boards and belt. The skirt boards require repeated adjustment to maintain the desired gap, and also require periodic replacement. Adjustment and replacement are difficult because the skirt boards are held in place by bolts or other fasteners.

SUMMARY OF THE INVENTION

An object of the present invention is to provide a new and improved dust seal for preventing the escape of particles of material in a conveyor belt system.

Another object of the present invention is to provide a new and improved dust seal for conveyor belt systems that includes multiple sides for engaging the belt of the system so that it may be rotated as each side becomes worn thereby increasing the life of the dust seal.

A further object of the present invention is to provide a new and improved dust seal for a conveyor belt system that may be positioned on the belt without leaving a small gap between the dust seal and the upper surface of the belt.

Another object is to provide a new and improved dust seal which does not require adjustment, and which can easily and quickly be replaced, even while the conveyor is operating.

Another object of the present invention is to provide a new and improved dust seal for a conveyor belt system that is economical to produce and easily manufactured.

The present invention is directed to a new and improved dust seal to be used in a conveyor belt system. The system includes a material chute that is in communication with a material hopper. The chute deposits material onto a moving conveyor belt for transport to another location.

In order to prevent the escape of fines or small particles of material from between the chute and the moving conveyor belt, the dust seal of the present invention is employed. The dust seal of the present invention includes an elongated body having an axial bore extending along the length thereof. The body is of a multi-sided or polygonal cross-sectional configuration and in the preferred embodiment is rectangular. One side of the body is positioned on the belt and a rope or similar securement device is passed along the bore and looped upstream to be coupled to the conveyor belt system to secure the dust seal at the desired downstream position relative to the chute.

Upon operating the system such that the belt moves downstream relative to the chute, the frictional engagement between the dust seal and the belt and the troughing or sloping of the belt toward the center results in the dust seal moving along the belt transverse to the belt's length until another side of the dust seal engages the side of the chute. Once this occurs, a complete and satisfactory seal is accomplished.

After a period of use of the dust seal whereupon the side engaging the upper surface of the belt becomes worn, the dust seal may be rotated by the operator of the system such that another side of the body engages the upper surface of the belt thereby extending the service life of the dust seal and eliminating the necessity for continual adjustment of the dust seal to correct for wear.

BRIEF DESCRIPTION OF THE DRAWING

The above and other objects and advantages and novel features of the present invention will become apparent from the following detailed description of the preferred embodiment of the invention illustrated in the accompanying drawing, wherein:

FIG. 1 is a simplified, somewhat schematic, elevational illustration of a conveyor belt system that includes dust seals constructed in accordance with the principles of the present invention;

FIG. 2 is an enlarged cross-sectional view of the system illustrated in FIG. 1 taken along line 2—2 of FIG. 1;

FIG. 3 is a perspective side view of the system; and

FIG. 4 is a fragmentary perspective view of the dust seal.

DETAILED DESCRIPTION OF THE PREFERRED EMBODIMENT

With reference now to the drawing, there is illustrated a conveyor belt system schematically illustrated and generally designated by the reference numeral 10. The system 10 may be of any type well known in the art such as that illustrated in U.S. Pat. No. 2,883,035. The conveyor belt system 10 is employed to transport material from one location to another economically and conveniently.

The conveyor belt system 10 includes a material chute 12 that is in communication with a material hopper (not shown). The material chute 12 functions to deposit material 14, such as sand, grain, coal, or a similar material onto a conveyor belt generally designated by the numeral 16. The belt 16 is continuous and includes an upper portion 16A moving downstream of the chute 12 and a lower portion 16B returning to the chute 12. Material deposited on the conveyor belt 16 moves downstream from the chute 12 to another location, as for example the bed of a truck, whereupon the material 14 is deposited at that location.

To move the belt in a continuous circuit, a terminal pulley 18 is employed. One or more additional terminal pulleys may be employed at different locations on the belt 16, and a suitable mechanism (not shown) causes the belt 16 to move in a continuous fashion around a closed path. As best illustrated in FIG. 3, the belt 16 is continuous and is looped around the terminal pulley 18 to be rotated past the chute 12.

To support the belt 16 along its length, idler roll assemblies 20 are positioned at spaced locations along the length of the belt 16. The idler roll assemblies 20 include individual rollers 22 that are rotatably mounted on a shaft 24 and rotate under the influence of the movement of the belt 16. The idler roll assemblies 20 in addition to supporting the belt 16 along the length of its travel maintain the belt 16 in a slope or troughed configuration such that the material 14 is retained toward the center of the belt 16.

With particular reference to FIG. 2, the material 14 as it flows through the chute 12 is directed by a pair of baffles 26 positioned within the chute 12 to deposit the material 14 substantially near the center of the belt 16. Due to the rapid movement of the material 14 through the chute 12 and onto the belt 16 and to the movement of the belt 16 away from the chute 12, substantial turbulence is developed around the chute 12 and between the chute 12 and the belt 16. As material 14 is deposited on the belt 16, this turbulence tends to impart a swirling motion to particles of material or fines 27.

In order to reduce wear since the chute 12 is fabricated from metal and the belt 16 is fabricated from a rubber-like material of a durometer hardness of approximately 55–60, the lower end of the chute 12 is elevated relative to the upper surface of the belt portion 16A defining a gap 28. The dust or particles of material 27 that are disturbed by the turbulence around the chute 12 and the upper belt portion 16A can exhibit a fluid-like mobility and should be prevented from escaping through the gap 28.

To reduce or prevent the escape of the fines or particles of dust 27 through the gap 28, a dust seal generally designated by the reference numeral 30 is employed. The dust seal 30 includes an elongated, unitary body 32 fabricated from a resilient material that in the preferred embodiment is 40 durometer cast urethane. Other procedures may be employed to fabricate the dust seal 30 as, for example, extrusion or similar procedures.

The body 32 is of a polygonal or multi-sided configuration, and in the embodiment illustrated is generally rectangular or square, including four sides 34. Defined by the sides and within the body 32 is an elongated central axial opening or bore 36 that extends the full length of the body 32. To position the dust seal 30 on the system 10 to seal the gaps 28, one of the sides 34 of the dust seal 30 is placed onto the belt 16 such that one side 34 engages the upper surface of the portion 16A.

The seal 30 is held in a position along the side of the chute 12 and on the upper surface of the belt portion 16A by a securement member such as the rope 38. The rope 38 is looped around stanchions 40 or similar upstream structure that are secured to the system 10 in a manner well known in the art. The rope 38 extends through the bore 36 of the body 32 and is looped around the downstream end of the dust seal 30 and returned to the stanchion 40 where the rope 38 is secured. In this manner, the dust seal 30 rests in position on top of the upper surface of the belt portion 16A and is held by an axial force provided by the rope 38. The rope 38 also provides additional weight to hold the dust seal 30 onto the belt portion 16A.

Upon starting of the system 10, gravity due to the trough configuration of the belt 16 and the frictional force developed by the movement of the belt 16 relative to the dust seal 30 results in the dust seal 30 moving toward the chute 12 until another side 34 of the body 32 engages the side of the chute 12 thereby sealing the gap 28. In essence, the seal since it is unsupported in the direction normal to the belt is able to slide downhill into contact with the chute.

Since in a preferred embodiment the body 32 of the dust seal 30 is made of a material having a lower durometer hardness than that of the belt, the side 34 of the body 32 engaging the belt portion 16A wears instead of the belt portion 16A. This wear is distributed over the entire large surface of side wall 34, and wear occurs slowly. Once the side 34 engaging the belt portion 16A has worn thin, the dust seal 30 may be rotated such that another side 34 engages the belt 16. Since the dust seal is self-compensating for wear, the need for continuous adjustment of the position of the dust seal 30 is avoided.

The flat sides 34 are also desirable since they provide stability to the dust seal 30 as the belt portion 16A moves underneath the body 32. Furthermore, the wide flat sides 34 provide an increased wear area on the belt 16 and on the dust seal 30, thereby slowing the wearing process due to the engagement of the dust seal 30 with the belt portion 16A.

Not only does the lower durometer hardness of the seal body 32 reduce wear of the belt 16, but the softness of the material exhibits a tendency to stick to the sheet metal of the chute 12 and to the belt 16 thereby providing a more complete and efficient seal.

In the preferred embodiment illustrated, the dust seal 30 extends only a short distance beyond the chute 12; however, the dust seals 30 may extend a greater distance beyond the chute 12 to assist in centering the load of material 14 onto the belt 16.

While only a single embodiment of the present invention has been shown, it will be understood that various changes and modifications may occur to those skilled in the art as, for example, the configuration of the seal 30 may be of a shape other than rectangular. It is therefore contemplated by the appended claims to encompass all such changes and modifications as fall within the true spirit and scope of the present invention.

What is claimed as new and desired to be secured by Letters Patent of the United States is:

1. A seal for sealing a gap between a belt conveyor and a material loading chute comprising:
    an elongated body including multiple sides, each of said multiple sides being of a dimension larger than said gap;
    a longitudinal bore in said body defined by said sides and means for securing said seal to said conveyor, said securement means including a flexible securement member attached to said conveyor at a location upstream of said seal and extending through said bore allowing transverse movement of said seal relative to said chute and biasing a side of said seal into engagement with the belt of said conveyor.

2. The seal claimed in claim 1 wherein said body is fabricated from a resilient material of a lower durometer hardness than the material of the belt of said belt conveyor.

3. A dust seal for preventing the escape of material between a material chute and a belt of a belt conveyor system, said seal comprising:
    an elongated body of a polygonal configuration, said body including an elongated bore; and
    securement means for securing said body to said belt conveyor system at a position adjacent said chute, said securement means including a securement member with a first end of said member secured to said conveyor system and a second end of said member extending through said bore providing axial support such that said seal is unsupported in the direction transverse to said belt and said seal lies on said belt with a side of said body engaging said chute.

4. The seal set forth in claim 3 wherein said body is fabricated of a material of a durometer hardness less than the durometer hardness of said belt.

5. The seal set forth in claim 3 wherein said configuration is substantially rectangular.

6. In combination
    a belt conveyor system including a continuous belt and means for moving said belt, a material chute for loading material onto said belt, said chute including a lower edge spaced from the upper surface of said belt by a gap; and
    a dust seal for sealing said gap to prevent the escape of material through said gap, said seal including a unitary body fabricated from resilient material and having a uniform polygonal cross-section throughout its length, said body including an elongated central axial opening, and means for maintaining a side of said body against said belt and another side of said body against said chute, said belt being sloped toward the center of said belt, said slope and the movement of said belt imparting a force due to friction and gravity against said seal moving said another side of said body against said chute, said maintaining means comprises a flexible maintaining member extending through said bore with at least a first end secured to said system upstream of said chute allowing transverse movement of said seal relative to said chute.

7. The combination claimed in claim 6 wherein said material of said body is of a durometer hardness less than the durometer hardness of said belt.

* * * * *